United States Patent
Salemi et al.

(10) Patent No.: US 6,869,456 B2
(45) Date of Patent: Mar. 22, 2005

(54) METHOD FOR STARTING A FAST LIGHT-OFF CATALYTIC FUEL REFORMER

(75) Inventors: Michael R. Salemi, Rochester, NY (US); Jonathon R. Bennett, Lima, NY (US); Richard Nashburn, Honeoye Falls, NY (US); John Kirwan, Troy, MI (US); Ather A. Quader, Rochester Hills, MI (US); James M. Haller, Victor, NY (US)

(73) Assignee: Delphi Technologies, Inc., Troy, MI (US)

( * ) Notice: Subject to any disclaimer, the term of this patent is extended or adjusted under 35 U.S.C. 154(b) by 91 days.

(21) Appl. No.: 10/229,729

(22) Filed: Aug. 28, 2002

(65) Prior Publication Data

US 2003/0000145 A1 Jan. 2, 2003

Related U.S. Application Data

(63) Continuation-in-part of application No. 09/604,129, filed on Jun. 27, 2000.

(51) Int. Cl.[7] ................................................. C01B 3/24
(52) U.S. Cl. .................... 48/197 R; 48/198.1; 48/198.7
(58) Field of Search .............................. 48/61, 62, 63, 48/75, 197 R, 198.1, 198.7, 211, 212, 214 R, 215, 214 A, 62 R, 65, 127.9

(56) References Cited

U.S. PATENT DOCUMENTS 6,383,468 B1 * 5/2002 Schussler et al. ........... 423/651
6,423,896 B1   7/2002 Keegan
6,464,947 B2  10/2002 Balland
6,481,641 B1  11/2002 Mieney
6,485,852 B1  11/2002 Miller et al.
6,562,496 B2   5/2003 Faville et al.
6,562,502 B2   5/2003 Haltiner, Jr.
6,608,463 B1   8/2003 Kelly et al.
2002/0110711 A1 *  8/2002 Boneberg et al.
2003/0233789 A1 * 12/2003 Dauer et al.

FOREIGN PATENT DOCUMENTS

WO     WO 99/31012     *  6/1999

* cited by examiner

Primary Examiner—Kiley S. Stoner
Assistant Examiner—Len Tran
(74) Attorney, Agent, or Firm—Patrick M. Griffin

(57) ABSTRACT

A method for starting a fast light-off catalytic reformer for producing hydrogen-rich reformate fuel from hydrocarbon fuel and air, the reformer having means for receiving flows of fuel and air, a reforming catalyst for reforming the fuel and air mixture, and an ignition device. A control system selects fuel and air flow rates to form a lean fuel/air mixture and operates the ignition device to ignite the lean mixture to produce hot exhaust gases that flow over and heat the reforming catalyst for a first length of time. Fuel flow is then stopped temporarily for a second length of time, and further ignition is terminated. Fuel flow is then restarted and adjusted to provide a rich fuel/air mixture which is directed to the heated catalyst for reforming into reformate fuel. Air flow may also be adjusted in setting the lean and/or rich fuel/air mixtures.

14 Claims, 2 Drawing Sheets

METHOD FOR STARTING A FAST LIGHT-OFF CATALYTIC FUEL REFORMER

CROSS-REFERENCE TO RELATED APPLICATIONS

The present application is a Continuation-In-Part of a pending U.S. patent application, Ser. No. 09/604,129, filed Jun. 27, 2000.

TECHNICAL FIELD

The present invention relates to a catalytic reformer and method for converting a hydrocarbon stream to a reformate fuel stream comprising hydrogen; more particularly, to a fast light-off catalytic reformer and method for rapid production of reformate for hydrogen coldstart in an internal combustion engine; and most particularly, to a method for quenching a start-up combustion reaction in the reformer prior to initiating reforming of fuel. The present invention is useful for providing reformate to a fuel cell, and especially a solid oxide fuel cell.

BACKGROUND OF THE INVENTION

A catalytic hydrocarbon fuel reformer converts a fuel stream comprising, for example, natural gas, light distillates, methanol, propane, naphtha, kerosene, gasoline, diesel fuel, or combinations thereof, and air, into a hydrogen-rich reformate fuel stream comprising a gaseous blend of hydrogen, carbon monoxide and nitrogen (ignoring trace components). In the reforming process, the raw hydrocarbon fuel stream is typically percolated with oxygen in the form of air through a catalyst bed or beds contained within reactor tubes mounted in the reformer vessel. The catalytic conversion process is typically carried out at elevated catalyst temperatures in the range of about 700° C. to about 1100° C.

The produced hydrogen-rich reformate stream may be used, for example, as the fuel gas stream feeding the anode of an electrochemical fuel cell after passing the reformate stream through a water gas shift reactor and/or other purification means such as a carbon monoxide selective oxidizer. Reformate is particularly well suited to fueling a solid oxide fuel cell (SOFC) system because the purification step for removal of carbon monoxide is not required for an SOFC.

During operation of most reformers of this type, tail gas from the fuel cell is burned and the burner exhaust passes through a plenum within the vessel, contacting and heating the outer surface of the reactor tubes and thereby heating the catalyst.

The hydrogen-rich reformate stream may also be used as a hydrogen fuel to fuel a spark-ignited (SI) engine, either alone or in combination with gasoline. Hydrogen-fueled vehicles are of interest as low-emissions vehicles because hydrogen as a fuel or a fuel additive can significantly reduce air pollution and can be produced from a variety of fuels. Hydrogen permits an engine to run with very lean fuel-air mixtures that greatly reduce production of NOx. As a gasoline additive, small amounts of supplemental hydrogen fuel may allow conventional gasoline internal combustion engines to reach nearly zero emissions levels.

A problem in the past has been how to elevate the temperature of the catalyst quickly in order to begin generating reformate in the shortest possible time. An approach disclosed in the parent to this application is to incorporate into the reformer a "fast light-off" system wherein a fuel/air mixture, essentially stoichiometric, is ignited in the reformer, preferably upstream of the catalyst, for a brief period at start-up. The exhaust gas, passing through the reformer in contact with the catalyst, heats the catalyst very rapidly. Such combustion typically is needed for only a few seconds, after which ignition is terminated and the mixture is made very fuel-rich for reforming.

A problem exists, however, in how to make the transition from the fuel-lean mixture and combustion to the fuel-rich mixture and reforming. It is desirable to extinguish combustion before changing over from lean to rich mixture to prevent brief but intense coking of the catalyst surfaces caused by burning the rich mixture. However, simply stopping ignition has been found to be insufficient. One approach has been to include a flame arrestor between the combustion chamber and the reformer, which approach can be successful in preventing coking but also has been found to reduce very substantially and undesirably the rate at which the pre-combustion heats the catalyst, thus extending undesirably the start-up period.

What is needed is a means for changing over from combustion mode to reforming mode very quickly without a flame arrestor and also without coking of the catalyst surfaces.

SUMMARY OF THE INVENTION

A fast light-off catalytic reformer and method for fast start-up is provided. The reformer includes at least one reactor tube having an inlet for receiving a flow of fuel and a flow of air, a reforming catalyst disposed within the reactor tube for converting the fuel and air to a reformate stream, and an outlet for discharging the produced reformate stream. An ignition device is disposed within the reactor tube for initiating an exothermic reaction between the fuel and air. Heat generated thereby warms the catalyst to provide fast light-off of the reformer. An associated control system selects fuel and air flow delivery rates and operates the ignition device so as to achieve fast light-off of the reforming catalyst at start-up and to maintain the catalyst at a temperature sufficient to optimize reformate yield. The system operates at a lean fuel/air mixture during ignition and combustion mode, then switches over to a rich fuel/air mixture during reforming mode.

A method for starting up and switching over the mixtures includes supplying a flow of lean fuel/air mixture to the catalytic reformer; igniting the lean mixture within the reactor tube for a brief period of time, preferably less than about 2 seconds, to rapidly heat the reforming catalyst with the heat of combustion; stopping ignition; stopping completely the flow of fuel into the reactor tube for a short period of time, preferably between about 100 and 200 milliseconds; and restoring the flow of fuel at a rich fuel/mixture suitable for reforming. The present method provides the advantage of rapid production of high yields of reformate by not coking the catalyst during mixture changeover and is particularly useful for on-board fuel reforming in meeting SULEV emissions with spark-ignition engines, especially with larger, high-emissions vehicles. The present fast light-off reformer and method is also well suited for providing rapid production of reformate to other power generation systems, such as fuel cells, and is particularly useful for start up and fueling solid oxide fuel cells.

These and other features and advantages of the invention will be more fully understood from the following description of certain specific embodiments of the invention taken together with the accompanying drawings.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
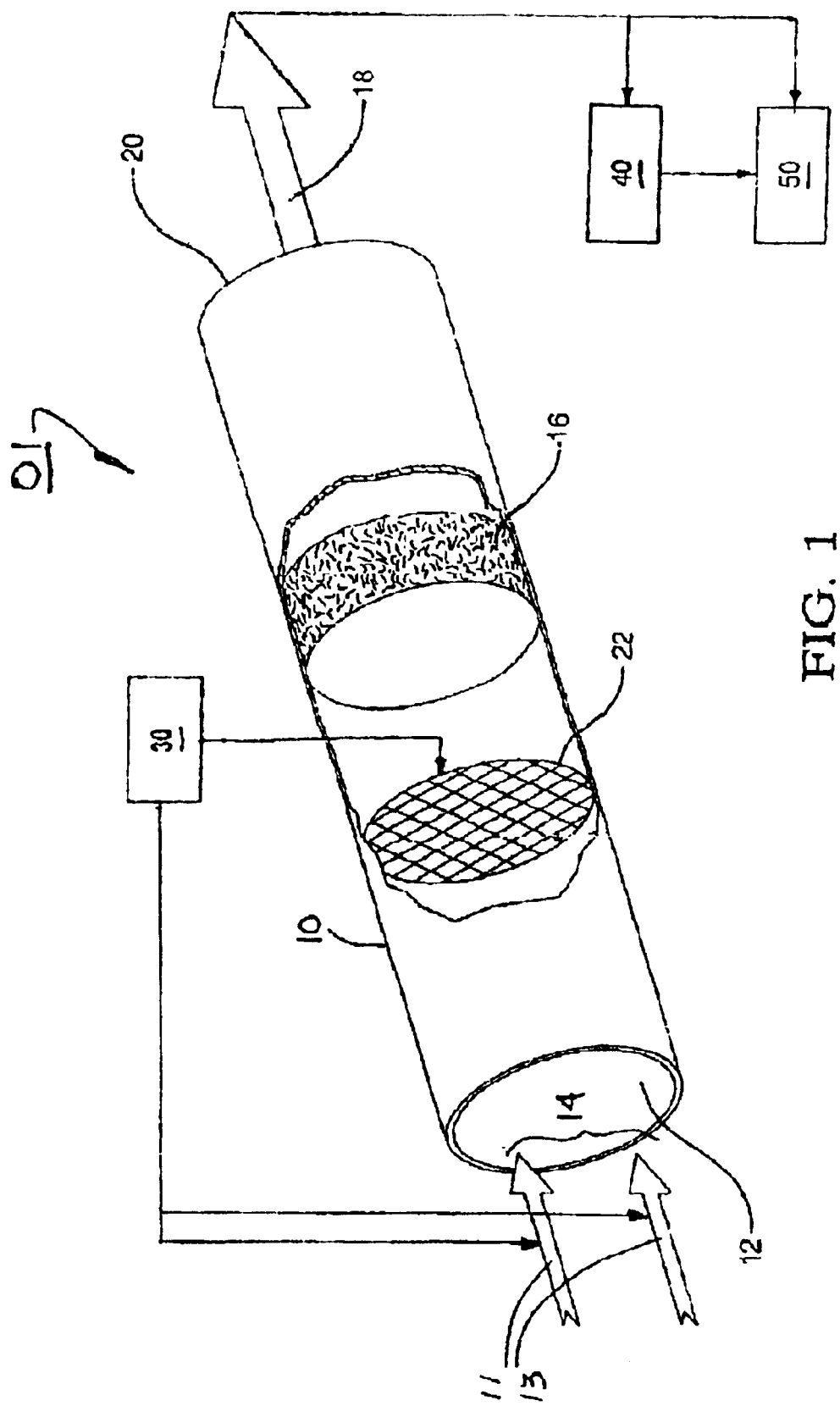
FIG. 1 is an isometric view, partially in section, of an embodiment of a fast light-off catalytic reformer in accordance with the present invention.

Referring to FIG. 1, a fast light-off catalytic reformer 01 in accordance with one possible embodiment of the present invention includes a reactor tube 10 having an inlet 12 in a first end for receiving a flow of fuel 11 and a flow of air 13, shown as combined fuel-air mixture 14. Reactor tube 10 may be any shape, but preferably comprises a substantially cylindrical reactor tube. While the present description discusses a single reactor tube 10, reforming catalyst 16, and ignition device 22, the present fast light-off reformer may comprise more than one reactor tube, as desired.

Reforming catalyst 16 is disposed within reactor tube 10 and may comprise any reforming catalyst material suitable for converting the fuel feedstock and air to reformate, including, but not limited to, for example, rhodium, platinum, their alloys, and combinations thereof. Preferably, a protective coating or firewall (not shown) is disposed about catalyst 16. During operation, a fuel-rich mixture comprising air and a liquid hydrocarbon fuel such as natural gas, light distillates, methanol, propane, naphtha, kerosene, gasoline, diesel fuel, or combinations thereof, is converted by catalyst 16 to a hydrogen rich reformate fuel stream 18 that is discharged through outlet 20.

Ignition device 22 is disposed within the reactor tube 10 to initiate an exothermic reaction in fuel and air flow 14. Heat generated by this reaction is used to provide fast light-off (i.e., extremely rapid heating) of reforming catalyst 16. The ignition device preferably is located upstream of the catalyst, but may alternatively be located at the front face thereof, within the catalyst, or at the rear face of the catalyst. In a preferred embodiment, the ignition device 22 is disposed within the reactor tube 10 upstream of the reforming catalyst 16, i.e., between inlet 12 and reforming catalyst 16. Ignition device 22 may be any device suitable for initiating exothermic reactions between fuel and air 14, including, but not limited to, a catalytic or non-catalytic substrate, such as a wire or gauze as shown in FIG. 1, for receiving electric current from a voltage source; a spark plug; a glow plug; or any combination thereof. An associated control system 30 selects and maintains the appropriate fuel and air delivery rates and operates the ignition device 22 so as to achieve fast light off of the reforming catalyst 16 at start-up and to maintain catalyst 16 at a temperature sufficient to optimize reformate 18 yield. The control means used herein may comprise any of various control means known in the art for providing air and fuel control and metering functions.

Excellent reformate yields from the reactor depend upon both a sufficiently high catalyst temperature and the appropriate fuel:air ratio. The optimum fuel/air mixture for producing reformate is very fuel rich, but leaner mixtures provide higher temperatures for rapidly heating the catalyst. Control system 30 varies the fuel:air ratio during start-up of the reformer as described below to rapidly obtain both the temperatures and fuel/air mixtures required for reforming.

Figure 2:
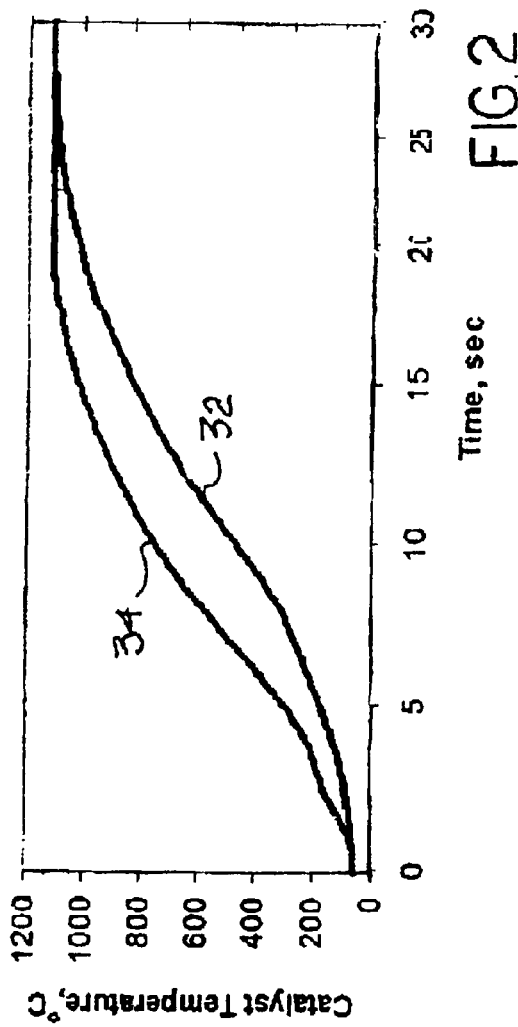
FIG. 2 is a graph of time vs. catalyst temperature, showing the benefit of operation without a flame arrestor between the pre-combustion chamber and the catalyst.
Figure 3:
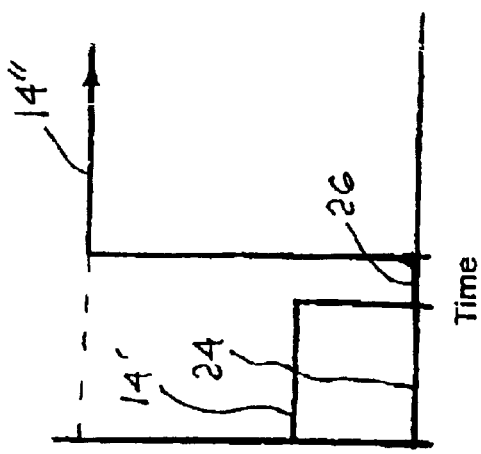
FIG. 3 is a graph of time vs. fuel/air mixture richness during start-up in accordance with a method of the invention.

Referring to FIGS. 1 through 3, in a method for starting up a reformer 01, control system 30 directs flows of fuel and air into reactor tube 10 at first predetermined fuel and air flow rates to provide a near-stoichiometric lean fuel/air mixture at a first fuel:air mass flow ratio 14'. Such lean flow continues for a first predetermined period of time 24, generally less than ten seconds and preferably less than about 2 seconds, during which time the mixture is periodically ignited by ignition device 22 to produce flame and hot exhaust which sweeps through and heats catalyst 16. At the end of this period of time 24, both the flow of fuel into reactor tube 10 and ignition of the fuel mixture are terminated. Fuel flow is stopped for a second predetermined period of time 26, generally less than five seconds and preferably between about 100 and 200 about milliseconds, allowing combustion to cease, thereby preventing ignition of subsequent fuel-rich mixture and coking or fouling of the catalyst surfaces. Fuel flow is then re-established by control system 30 at a second predetermined flow rate 14'' to provide a fuel-rich mixture for reforming, preferably at a second fuel:air ratio of about 2.5:1 to about 5:1 and preferably about 3:1 with respect to the first fuel/air ratio. Air flow may also be readjusted by control system 30 in providing the desired first and second flow ratios.

Referring to FIG. 2, the benefit of a reformer without a flame arrestor is shown. Curve 32 shows the catalyst heating rate in a typical reformer having a flame arrestor between the ignition point and the catalyst. Curve 34 shows the higher heating rate found in an identical reformer without such a flame arrestor.

The present fast light-off catalytic reformer and method produce rapid, high yields of reformate fuel. The produced reformate may be bottled in a vessel 40 or used to fuel any number of systems operating partially or wholly on reformate fuel. Such power generation systems 50 may include, but are not limited to, engines such as spark ignition engines, hybrid vehicles, diesel engines, fuel cells, particularly solid oxide fuel cells, or combinations thereof. The present fast light-off reformer and method may be variously integrated with such systems, as desired. For example, the present fast light-off reformer may be employed as an on-board reformer for a vehicle engine operating wholly or partially on reformate, the engine having a fuel inlet in fluid communication with the reformer outlet 20 for receiving reformate 18 therefrom. The present fast light-off reformer and method is particularly suitable for use as an on-board reformer for quickly generating reformate 18 for initial start-up of a system. The present reformer and method are particularly advantageous for hydrogen cold-start of an internal combustion engine, providing a supply of hydrogen-rich reformate which allows the engine exhaust to meet SULEV emissions levels immediately from cold-start. Vehicles wherein a fast light-off reformer operated in accordance with the present invention is useful may include automobiles, trucks, and other land vehicles, boats and ships, and aircraft including spacecraft.

While the invention has been described by reference to certain preferred embodiments, it should be understood that numerous changes may be made within the spirit and scope of the inventive concepts described. Accordingly, it is intended that the invention not be limited to the disclosed embodiments, but that it have the full scope permitted by the language of the following claims.

What is claimed is:

1. A method for starting a fast light-off catalytic reformer for converting hydrocarbon fuel and air to reformate, the reformer including a reactor tube, a reforming catalyst disposed within the reactor tube, an ignition device for igniting a fuel/air mixture within the reactor tube, and a control system for controlling fuel and air flow rates into the reactor tube and for controlling the ignition device, the method comprising the steps of:

a) setting a first fuel flow rate and a first air flow rate into said reformer to form a first fuel/air mixture having a first and predetermined mass ratio;

b) providing said first fuel/air mixture into said reformer for a first predetermined length of time;

c) igniting said first fuel/air mixture with said ignition device within said reformer at least once during said first predetermined length of time;

d) passing exhaust products of said ignition through said reforming catalyst to raise the temperature thereof;

e) terminating flow of fuel into said reformer at the end of said first predetermined length of time, and simultaneously beginning a second predetermined length of time during which second predetermined length of time no fuel flows into said reformer;

f) terminating ignition action in said reformer during said second predetermined length of time;

g) at the end of said second predetermined length of time, flowing fuel and air into said reformer at a second fuel flow rate and a second air flow rate to form a second fuel/air mixture having a second and predetermined mass ratio; and h) passing said second fuel/air mixture into contact with said catalyst to reform said mixture into reformate.

2. A method in accordance with claim 1 wherein said first mass ratio is fuel-lean and said second mass ratio is fuel rich relative to fuel/air ratios for fueling an internal combustion engine.

3. A method in accordance with claim 1 wherein said first mass ratio is about stoichiometric for complete oxidation of said fuel.

4. A method in accordance with claim 1 wherein said second mass ratio is between about 3 and about 5 times richer in fuel than is said first mass ratio.

5. A method in accordance with claim 1 wherein said first predetermined length of time is less than about ten seconds.

6. A method in accordance with claim 1 wherein said first predetermined length of time is about two seconds.

7. A method in accordance with claim 1 wherein said second predetermined length of time is less than about five seconds.

8. A method in accordance with claim 1 wherein said second predetermined length of time is between about 100 and about 200 milliseconds.

9. A method in accordance with claim 1 wherein said fuel is selected from the group consisting of natural gas, light distillates, methanol, propane, naphtha, kerosene, gasoline, diesel fuel, and combinations thereof.

10. A method in accordance with claim 1 wherein said reformer is coupled to an internal combustion engine for providing a hydrogen-rich reformate for combustion.

11. A method in accordance with claim 1 wherein said reformer is coupled to a fuel cell.

12. A method in accordance with claim 11 wherein said fuel cell is a solid-oxide fuel cell.

13. A method in accordance with claim 11 wherein said fuel cell provides electric power to a vehicle.

14. A method in accordance with claim 13 wherein said vehicle is selected from the group consisting of land vehicle, boat, ship, and aircraft including spacecraft.

* * * * *